(12) United States Patent
Arimoto et al.

(10) Patent No.: US 7,817,346 B2
(45) Date of Patent: Oct. 19, 2010

(54) ZOOM LENS AND IMAGE CAPTURE APPARATUS

(75) Inventors: Tetsuya Arimoto, Osaka (JP); Yasushi Yamamoto, Osaka (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 11/902,722

(22) Filed: Sep. 25, 2007

(65) Prior Publication Data

US 2008/0198475 A1    Aug. 21, 2008

(30) Foreign Application Priority Data

Oct. 2, 2006    (JP)    .............. P2006-270765

(51) Int. Cl.
G02B 15/14    (2006.01)
(52) U.S. Cl. ..................... 359/687; 359/683
(58) Field of Classification Search ............. 359/687, 359/683
See application file for complete search history.

(56) References Cited

U.S. PATENT DOCUMENTS

| 7,253,965 | B2 * | 8/2007 | Shibayama et al. | ......... 359/687 |
| 2004/0184160 | A1 * | 9/2004 | Nishina et al. | ............. 359/690 |
| 2006/0152815 | A1 * | 7/2006 | Satori | ..................... 359/680 |

FOREIGN PATENT DOCUMENTS

| JP | 04-208912 | 7/1992 |
| JP | 06-003592 | 1/1994 |
| JP | 09-005629 A | 1/1997 |
| JP | 10-197794 | 7/1998 |
| JP | 11-295601 | 10/1999 |
| JP | 2004-101739 | 4/2004 |
| JP | 2004-198529 | 7/2004 |
| JP | 2004-198855 A | 7/2004 |
| JP | 2004-240398 A | 8/2004 |
| JP | 2004-286811 A | 10/2004 |
| JP | 2004-333664 A | 11/2004 |
| JP | 2005-157097 A | 6/2005 |
| JP | 2005-181556 | 7/2005 |

* cited by examiner

*Primary Examiner*—Jordan M. Schwartz
(74) *Attorney, Agent, or Firm*—Rader, Fishman & Grauer PLLC

(57) ABSTRACT

A zoom lens includes, in an order from an object side, a first lens group having positive refractive power; a second lens group having negative refractive power; a third lens group having positive refractive power; and a fourth lens group having positive refractive power, and in which, during power variation from a wide-angle end to a telephoto end, a distance between the first lens group and the second lens group increases, a distance between the second lens group and the third lens group decreases, and a distance between the third lens group and the fourth lens group decreases, and the zoom lens includes at least one cemented-triplet lens block having negative refractive power, in the fourth lens group.

10 Claims, 7 Drawing Sheets

ZOOM LENS AND IMAGE CAPTURE APPARATUS

BACKGROUND OF THE INVENTION

1. Field of the Invention

The present invention relates to a zoom lens and an image capture apparatus, and particularly to a zoom lens which is suitable for an interchangeable lens releasably attached to a silver-salt-film single-lens reflex camera or a digital single-lens reflex camera, being high-performance and ensuring sufficient lens back focus, and to an image capture apparatus using such a zoom lens.

2. Description of Related Art

In recent years, as the number of pixels in photoelectric conversion devices increases, there are demands for higher-performance image-taking optical systems, and moreover, for zoom lenses with small F-numbers covering a wide-angle range. In addition, in interchangeable lenses, there is a restriction that sufficient lens back focus be ensured, and this leads to difficulties in, e.g., correcting distortion associated with their wider-angle implementations.

In a related art, e.g., Japanese Patent Application Publication No. JP 2004-198529 (Patent Literature 1) proposes a zoom lens having an F-number at a wide-angle end of 2.8, with a six-group zooming configuration including, in the following order from an object side, a negative first lens group, a positive second lens group, a negative third lens group, a positive fourth lens group, a negative fifth lens group, and a positive sixth lens group.

In addition, Japanese Patent Application Publication No. JP 2004-101739 (Patent Literature 2) proposes a zoom lens whose F-number is in the order of 2.9 in the entire zooming range, with a four-group configuration, in which a positive first lens group, a negative second lens group, a positive third lens group, and a positive fourth lens group are arranged in order of mention from the object side, and all the lens groups move independently of one another during power variation.

SUMMARY OF THE INVENTION

However, the zoom lens disclosed in Patent Literature 1 requires the six-group configuration, which in turn makes a zoom barrel construction complicated, whereas the zoom lens disclosed in Patent Literature 2 has an angle of view at the wide-angle end of approximately 75 degrees, which is insufficient.

In view of the above and other issues, it is desirable to provide a zoom lens which is suitable for an interchangeable lens releasably attached to a silver-salt-film single-lens reflex camera or a digital single-lens reflex lens, being high-performance and compact and ensuring sufficient back focus, and an image capture apparatus using such a zoom lens.

According to one embodiment of the present invention, there is provided a zoom lens which includes, in the following order from an object side, a first lens group having positive refractive power; a second lens group having negative refractive power; a third lens group having positive refractive power; and a fourth lens group having positive refractive power. During power variation from a wide-angle end to a telephoto end, a distance between the first lens group and the second lens group increases, a distance between the second lens group and the third lens group decreases, and a distance between the third lens group and the fourth lens group decreases. The zoom lens includes at least one cemented-triplet lens block having negative refractive power, in the fourth lens group.

Furthermore, according to another embodiment of the present invention, there is provided an image capture apparatus which includes a zoom lens and an imager device for converting an optical image formed by the zoom lens into an electrical signal. The zoom lens includes, in the following order from an object side, a first lens group having positive refractive power; a second lens group having negative refractive power; a third lens group having positive refractive power; and a fourth lens group having positive refractive power. During power variation from a wide-angle end to a telephoto end, a distance between the first lens group and the second lens group increases, a distance between the second lens group and the third lens group decreases, and a distance between the third lens group and the fourth lens group decreases. The zoom lens includes at least one cemented-triplet lens block having negative refractive power, in the fourth lens group.

These and other features and aspects of the invention are set forth in detail below with reference to the accompanying drawings in the following detailed description of the embodiments.

DETAILED DESCRIPTION OF THE EMBODIMENTS

Figure 1:
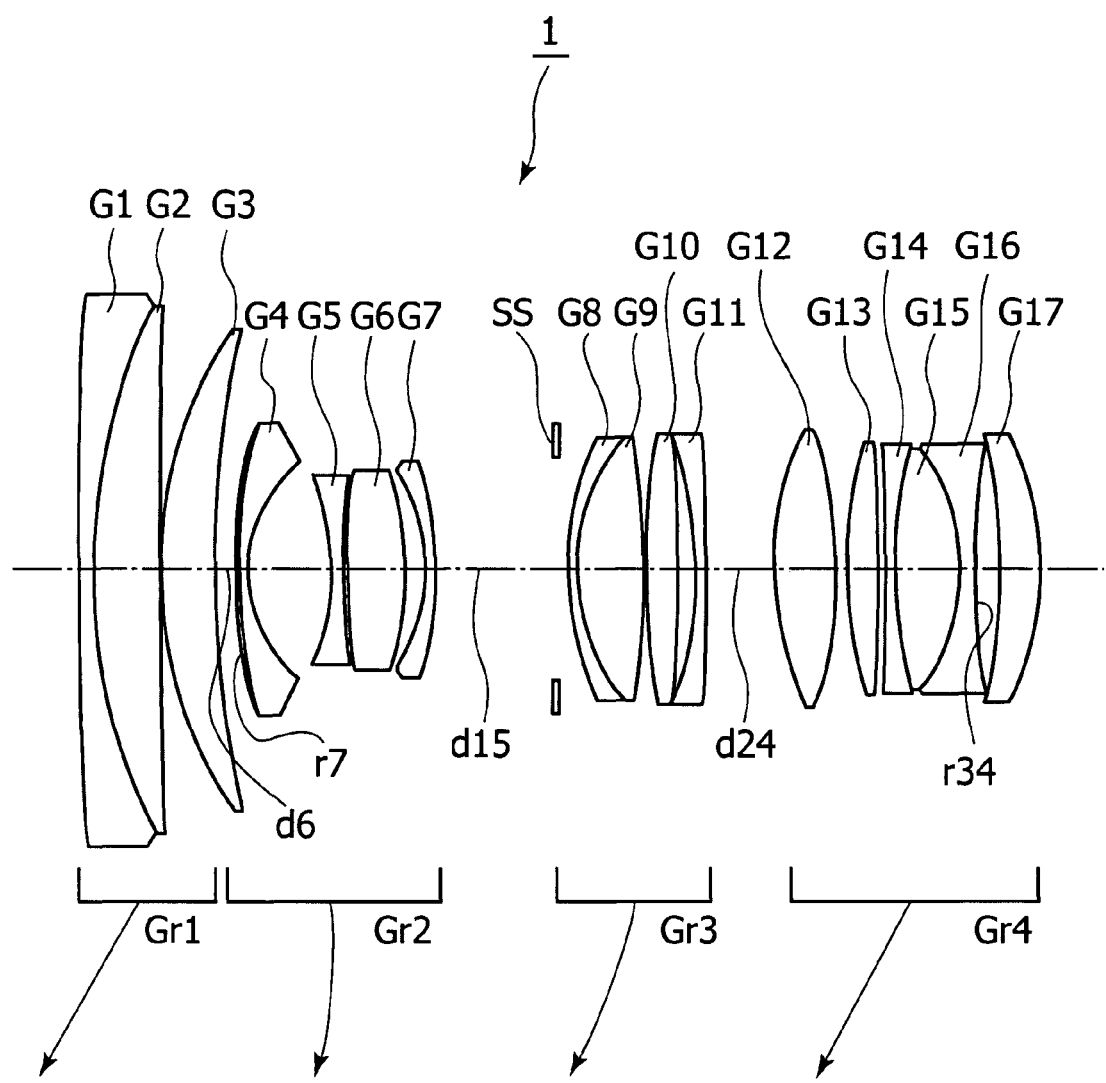
FIG. 1 is a diagram showing a lens construction of a zoom lens according to a first embodiment of the present invention.

Embodiments of a zoom lens and an image capture apparatus according to the present invention will be described below with reference to the accompanying drawings.

A zoom lens according to an embodiment of the present invention will be described first.

The zoom lens includes, in the following order from an object side, a first lens group having positive refractive power; a second lens group having negative refractive power; a third lens group having positive refractive power; and a fourth lens group having positive refractive power. During power variation from a wide-angle end to a telephoto end, a distance between the first and second lens groups increases, a distance between the second and third lens groups decreases, and a distance between the third and fourth lens groups decreases. The zoom lens includes at least one cemented-triplet lens block having negative refractive power, in the fourth lens group.

Accordingly, in the zoom lens, it is possible to achieve high performance and compactness, and also ensure lens back focus sufficiently.

The cemented-triplet lens block, e.g., a cemented triplet lens, may allow selection of a glass material that increases the degree of flexibility in correcting Petzval sums and chromatic aberration, and may further facilitate the correction of various aberrations, particularly higher-order aberrations, by controlling the power of its two cemented surfaces, so that the cemented-triplet lens block is well suited to zoom lenses with small F-numbers.

Generally, in a positive-negative-positive-positive four-group configuration, such as the zoom lens, the fourth lens group takes care of correcting aberrations occurring at the second lens group and the third lens group. Particularly, by increasing the power of positive lenses in the fourth lens group, Petzval aberration occurring in the second lens group can be corrected, but this technique may impair balance with other aberrations. Accordingly, by arranging, in the fourth lens group, a cemented triplet having negative refractive power as a whole, not only spherical aberration and astigmatism occurring at the positive lenses in the fourth lens group are corrected satisfactorily, but the power of the positive lenses can also be increased for correcting the Petzval sums. Consequently, it is desirable to arrange a cemented triplet which is highly capable of correcting aberrations, in the fourth lens group that bears a heavy burden of aberrations.

In the zoom lens, it is desirable that the cemented-triplet lens block include, in the following order from the object side, a lens having negative refractive power, a lens having positive refractive power, and a lens having negative refractive power.

With this configuration, refraction of intensive light rays is eliminated, so that it is possible to realize satisfactory correction of chromatic aberration, while suppressing the occurrence of aberrations.

In the zoom lens, it is desirable that the cemented-triplet lens block have at least one aspherical surface.

With this configuration, it is possible to correct coma aberration and curvature of field satisfactorily.

In the zoom lens, the aspherical surface of the cemented-triplet lens block is desirably formed on a surface closest to an image-plane side.

Through the surface closest to the image-plane side of the cemented-triplet lens block, an on-axis bundle and an off-axis bundle pass at positions distant from each other. Hence, by arranging the aspherical surface on a surface closest to the image side, it is possible to increase the degree of flexibility in correcting aberrations.

In the zoom lens, it is desirable to satisfy the following conditional formula (1):

$$0.3 < Ld1 - Ld2 < 0.6 \tag{1}$$

where:

Ld1 represents a refractive index of a lens positioned closest to the object side of the cemented-triplet lens block, and Ld2 represents a refractive index of a second lens counted from the object side of the cemented-triplet lens block.

The conditional formula (1) is intended to define a difference between the refractive index of the lens positioned closest to the object side and that of the second lens counted from the object side, of the cemented-triplet lens block. If the conditional formula (1) is satisfied, it is possible to compatibly correct sagittal flare and axial chromatic aberration over the entire zooming range. If the value of Ld1−Ld2 exceeds the upper limit defined in the conditional formula (1), the power of the cemented surfaces becomes so large that the sagittal flare becomes hard to control. Conversely, if the value of Ld1−Ld2 exceeds the lower limit defined in the conditional formula (1), the axial chromatic aberration becomes hard to correct.

In the zoom lens, it is further desirable to satisfy the following conditional formula (2), in order to give a better power arrangement in the optical system including the cemented triplet:

$$-0.8 < f2/fw < -0.2 \tag{2}$$

where:

f2 represents a composite focal length of the second lens group, and fw represents a composite focal length of the total system at the wide-angle end.

The conditional formula (2) is intended to define a focal length of the second lens group. If the conditional formula (2) is satisfied, it is possible to compatibly realize the correction of curvature of field at the wide-angle side and the provision of proper lens back focus. If the value of f2/fw exceeds the upper limit defined in the conditional formula (2), the refractive power of the second lens group decreases, thereby making it difficult to ensure illuminance at the wide-angle side in particular. If the value of f2/fw exceeds the lower limit defined in the conditional formula (2), the refractive power of the second lens group becomes so strong that the curvature of field at the wide-angle side in particular becomes hard to correct.

Specific embodiments of the zoom lens according to the present invention, and numerical embodiments obtained by applying specific numerical values to these embodiments will be described next with reference to the drawings and tables.

Note that an aspherical surface is introduced to each of the embodiments, and that the aspherical surface is to be defined by the following formula 1.

$$X = \frac{y^2 \cdot c^2}{1 + \sqrt{1 - \varepsilon \cdot y^2 \cdot c^2}} + \sum A^i \cdot Y^i \qquad \text{[Formula 1]}$$

In the formula 1, x represents a distance in a direction of an optical axis from the vertex of a lens surface, y represents a height as viewed in a direction perpendicular to the optical axis, c represents a paraxial curvature at the vertex of the lens surface, ϵ represents a cone constant, and $A^i$ represents an i-th-order aspherical coefficient.

FIG. 1 shows the lens construction at the wide-angle end of a zoom lens 1 according to a first embodiment, indicating, with arrows, motion loci of its constituent lens groups along the optical axis toward the telephoto end, respectively.

The zoom lens 1 includes, in the following order from the object side, a first lens group Gr1 having positive refractive power, a second lens group Gr2 having negative refractive power, a third lens group Gr3 having positive refractive power, and a fourth lens group Gr4 having positive refractive power. During zooming from the wide-angle end to the telephoto end, the first to fourth lens groups move toward the object side as indicated by the arrows, respectively, in FIG. 1 such that the distance between the first lens group Gr1 and the second lens group Gr2 increases, the distance between the second lens group Gr2 and the third lens group Gr3 decreases, and the distance between the third lens group Gr3 and the fourth lens group Gr4 decreases. Further, the second lens group Gr2 moves along the optical axis to perform focusing.

The first lens group Gr1 includes, in the following order from the object side, a cemented positive lens made of a negative meniscus lens G1 and a positive meniscus lens G2, each having a convex surface facing the object side; and a positive meniscus lens G3 having a convex surface facing the object side. The second lens group Gr2 includes, in the following order from the object side, a negative meniscus lens G4; a biconcave negative lens G5; a biconvex positive lens G6; and a negative meniscus lens G7 having a convex surface facing an image side. The lens G4 has a convex surface facing the object side, and also has a resin layer formed on the object side, the resin layer having an object-side surface formed of an aspherical surface. The third lens group Gr3 includes, in the following order from the object side, a cemented positive lens made of a negative meniscus lens G8 having a convex surface facing the object side and a biconvex positive lens G9; a biconvex positive lens G10; and a negative meniscus lens G11 having a convex surface facing the image side. The fourth lens group Gr4 includes, in the following order from the object side, a biconvex positive lens G12, a biconvex positive lens G13, a cemented-triplet negative lens (block), and a positive meniscus lens G17 having a convex surface facing the image side. The cemented-triplet negative lens (block) includes, in the following order from the object side, a biconcave negative lens G14, a biconvex positive lens G15, and a biconcave negative lens G16 having an image-side surface formed of an aspherical surface. Further, an aperture stop SS is arranged in proximity to the object side of the third lens group Gr3. The aperture stop SS moves together with the third lens group Gr3.

Table 1 shows lens data of a first numerical embodiment in which specific numerical values are applied to the zoom lens 1 according to the first embodiment. In Table 1 and other lens-data tables, "ri" denotes the paraxial radius of curvature of an i-th surface counted from the object side, "di" denotes the axial surface distance between the i-th surface and an (i+1)-th surface, "Ni" denotes the refractive index, relative to d-line, of an i-th glass member counted from the object side, and "vi" denotes the Abbe number, relative to d-line, of the i-th glass member counted from the object side. The "variable" for "di" means that the axial surface distance is variable. In addition, any lens-cementing material is deemed as a medium in a cemented lens, and "ri", "di", "Ni", and "vi" are also indicated for each cementing material.

TABLE 1

| RADIUS OF CURVATURE | AXIAL SURFACE DISTANCE | REFRACTIVE INDEX | ABBE NUMBER |
|---|---|---|---|
| r1 = 499.925 | d1 = 1.800 | N1 = 1.84666 | v1 = 23.78 |
| r2 = 70.243 | d2 = 0.010 | N2 = 1.51400 | v2 = 42.83 |
| r3 = 70.243 | d3 = 7.839 | N3 = 1.83481 | v3 = 42.72 |
| r4 = 702.158 | d4 = 0.150 | | |
| r5 = 51.782 | d5 = 6.482 | N4 = 1.83481 | v4 = 42.72 |
| r6 = 127.256 | d6 = variable | | |
| r7 = 129.646 | d7 = 0.200 | N5 = 1.51460 | v5 = 49.96 |
| r8 = 66.952 | d8 = 1.100 | N6 = 1.83481 | v6 = 42.72 |
| r9 = 16.638 | d9 = 10.242 | | |
| r10 = −27.950 | d10 = 1.200 | N7 = 1.77250 | v7 = 49.62 |
| r11 = 67.191 | d11 = 0.150 | | |
| r12 = 50.306 | d12 = 7.570 | N8 = 1.84666 | v8 = 23.78 |
| r13 = −37.485 | d13 = 2.475 | | |
| r14 = −21.750 | d14 = 1.000 | N9 = 1.80420 | v9 = 46.50 |
| r15 = −42.712 | d15 = variable | | |
| r16 = aperture stop | d16 = 1.500 | | |
| r17 = 37.205 | d17 = 1.000 | N10 = 1.88300 | v10 = 40.80 |
| r18 = 24.392 | d18 = 0.010 | N11 = 1.51400 | v11 = 42.83 |
| r19 = 24.392 | d19 = 8.279 | N12 = 1.56883 | v12 = 56.04 |
| r20 = −75.238 | d20 = 0.150 | | |
| r21 = 88.368 | d21 = 3.765 | N13 = 1.83481 | v13 = 42.72 |
| r22 = −140.100 | d22 = 2.200 | | |
| r23 = −44.921 | d23 = 1.200 | N14 = 1.90366 | v14 = 31.32 |
| r24 = −280.758 | d24 = variable | | |
| r25 = 38.490 | d25 = 7.474 | N15 = 1.49700 | v15 = 81.61 |
| r26 = −50.523 | d26 = 1.120 | | |
| r27 = 48.357 | d27 = 3.844 | N16 = 1.49700 | v16 = 81.61 |
| r28 = −260.303 | d28 = 1.161 | | |
| r29 = −180.563 | d29 = 0.950 | N17 = 1.90366 | v17 = 31.32 |
| r30 = 52.719 | d30 = 0.000 | N18 = 1.51400 | v18 = 42.83 |
| r31 = 52.719 | d31 = 8.000 | N19 = 1.49700 | v19 = 81.61 |
| r32 = −23.235 | d32 = 0.000 | N20 = 1.51400 | v20 = 42.83 |
| r33 = −23.235 | d33 = 1.600 | N21 = 1.77250 | v21 = 49.36 |
| r34 = −181.172 | d34 = 3.136 | | |
| r35 = −70.591 | d35 = 4.743 | N22 = 1.90366 | v22 = 31.32 |
| r36 = −36.247 | | | |

In Table 1, N2, v2, N11, v11, N18, v18, N20, and v20 denote the refractive indexes and the Abbe numbers of cementing materials in the cemented lenses.

The distance d6 between the first lens group Gr1 and the second lens group Gr2, the distance d15 between the second lens group Gr2 and the aperture stop SS, and the distance d24 between the third lens group Gr3 and the fourth lens group Gr4 vary during zooming from the wide-angle end to the telephoto end. The values of the respective distances d6, d15, and d24 in the first numerical embodiment measured at the wide-angle end (f=24.70), at an intermediate focal length (f=37.98) between the wide-angle end and the telephoto end, and at the telephoto end (f=68.28) are shown in Table 2 along with focal lengths f, F-numbers FNO, and angles of view 2ω.

TABLE 2

| f | 24.70 | 37.98 | 68.28 |
|---|---|---|---|
| FNO | 2.88 | 2.88 | 2.90 |
| 2ω | 83.6 | 58.8 | 34.3 |
| d6 | 2.667 | 11.578 | 27.552 |
| d15 | 14.555 | 7.229 | 1.200 |
| d24 | 8.110 | 3.155 | 0.500 |

A surface closest to the object side of the second lens group Gr2, i.e., an object-side surface r7 of the resin layer formed on the object-side surface of the negative meniscus lens G4, and an image-side surface r34 of the cemented-triplet negative lens of the fourth lens group Gr4, i.e., an image-side surface of the biconcave negative lens G16, are formed of aspherical surfaces. Aspherical coefficients of the above-mentioned surfaces in the first numerical embodiment are shown in Table 3 along with cone constants ϵ.

TABLE 3

ASPHERICAL COEFFICIENTS r7

ϵ = 1.0000
A4 = 0.17178371 × $10^{-4}$
A6 = −0.34835652 × $10^{-7}$
A8 = 0.16518227 × $10^{-9}$
A10 = −0.47170207 × $10^{-12}$
A12 = 0.74692047 × $10^{-15}$ r34

ϵ = 1.0000
A4 = 0.16716100 × $10^{-4}$
A6 = −0.20740902 × $10^{-8}$
A8 = 0.86242802 × $10^{-11}$
A10 = −0.34989489 × $10^{-13}$

Figure 2:
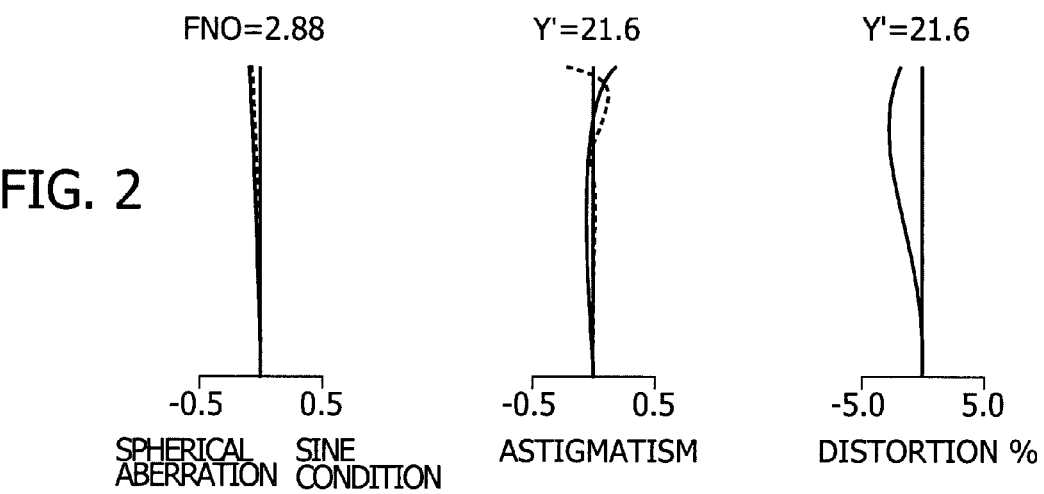
FIG. 2 is a graph showing, along with FIGS. 3 and 4, aberrations of a first numerical embodiment obtained by applying specific numerical values to the zoom lens according to the first embodiment, FIG. 2 showing a spherical aberration, an astigmatism, and a distortion measured at a wide-angle end.
Figure 3:
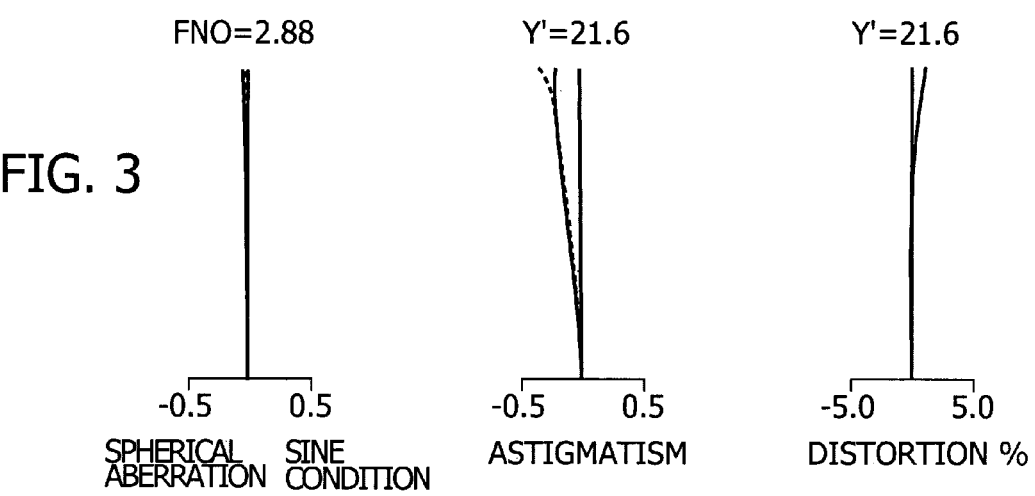
FIG. 3 is a graph showing a spherical aberration, an astigmatism, and a distortion measured at an intermediate focal length.
Figure 4:
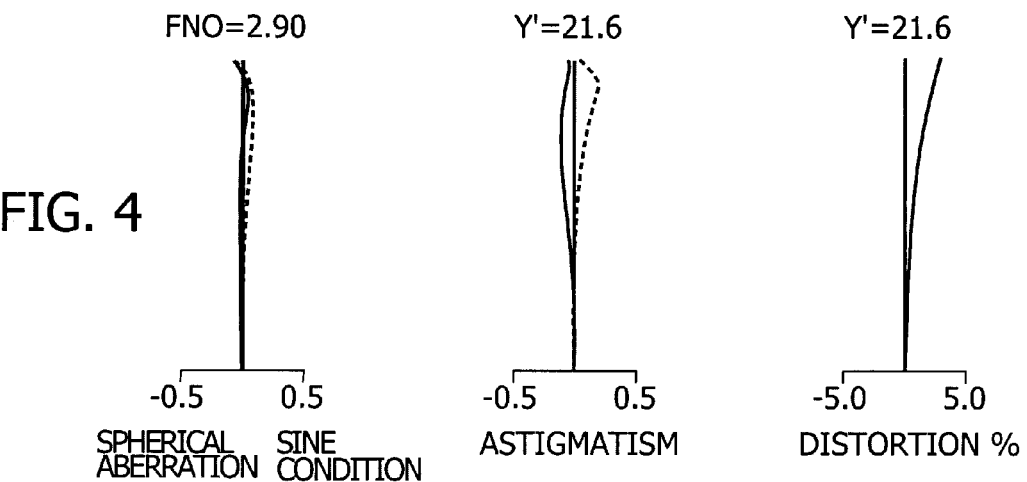
FIG. 4 is a graph showing a spherical aberration, an astigmatism, and a distortion measured at a telephoto end.

Each of FIGS. 2 to 4 shows a spherical aberration, an astigmatism, and a distortion in the first numerical embodiment which is in focus at infinity. FIG. 2 shows the aberrations measured at the wide-angle end, FIG. 3 shows the aberrations measured at the intermediate focal length, and FIG. 4 shows the aberrations measured at the telephoto end. In each of the spherical-aberration graphs, a solid line represents a spherical aberration at a d-line and a dashed line represents a sine condition. In each of the astigmatism graphs, a solid line represents a sagittal image plane and a dashed line represents a meridional image plane.

Figure 5:
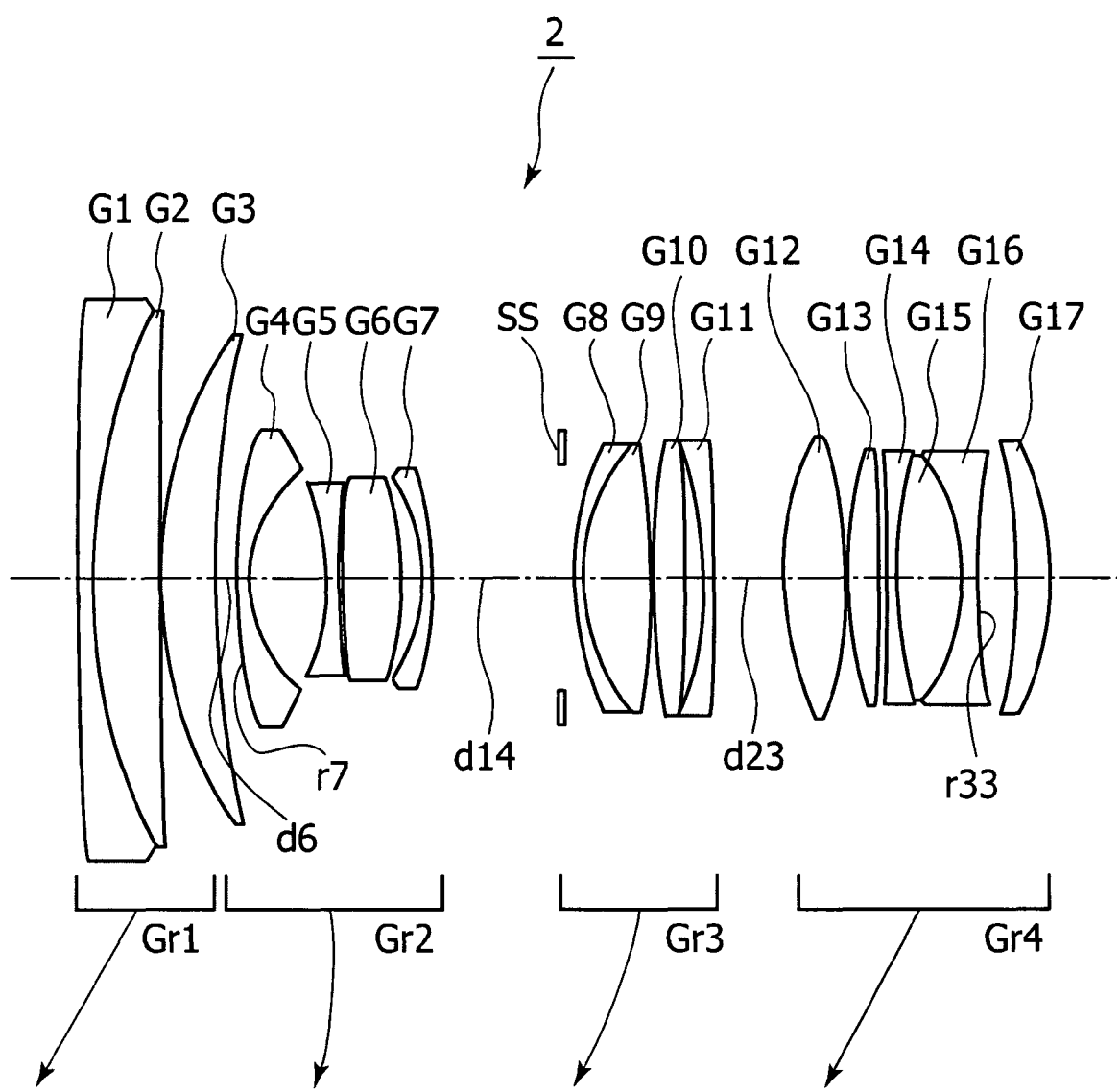
FIG. 5 is a diagram showing a lens construction of a zoom lens according to a second embodiment of the present invention.

FIG. 5 shows the lens construction at a wide-angle end of a zoom lens 2 according to a second embodiment, indicating, with arrows, motion loci of its constituent lens groups along the optical axis toward a telephoto end, respectively.

The zoom lens 2 includes, in the following order from the object side, a first lens group Gr1 having positive refractive power; a second lens group Gr2 having negative refractive power; a third lens group Gr3 having positive refractive power; and a fourth lens group Gr4 having positive refractive power. During zooming from the wide-angle end to the telephoto end, the first to fourth lens groups move toward the object side as indicated by the arrows, respectively, in FIG. 5 such that a distance between the first lens group Gr1 and the second lens group Gr2 increases, a distance between the second lens group Gr2 and the third lens group Gr3 decreases, and a distance between the third lens group Gr3 and the fourth lens group Gr4 decreases. Further, the second lens group Gr2 moves along the optical axis to perform focusing.

The first lens group Gr1 includes, in the following order from the object side, a cemented positive lens made of a negative meniscus lens G1 and a positive meniscus lens G2, each having a convex surface facing the object side; and a positive meniscus lens G3 having a convex surface facing the object side. The second lens group Gr2 includes, in the following order from the object side, a negative meniscus lens G4 having a convex surface facing the object side and having the object-side surface formed of an aspherical surface; a biconcave negative lens G5; a biconvex positive lens G6; and a negative meniscus lens G7 having a convex surface facing the image side. The third lens group Gr3 includes, in the following order from the object side, a cemented positive lens made of a negative meniscus lens G8 having a convex surface facing the object side and a biconvex positive lens G9; a biconvex positive lens G10; and a negative meniscus lens G11 having a convex surface facing the image side. The fourth lens group Gr4 includes, in the following order from the object side, a biconvex positive lens G12, a biconvex positive lens G13, a cemented-triplet negative lens (block), and a positive meniscus lens G17 having a convex surface facing the image side. The cemented-triplet negative lens (block) includes, in the following order from the object side, a biconcave negative lens G14, a biconvex positive lens G15, and a biconcave negative lens G16 having an image-side surface formed of an aspherical surface. Further, an aperture stop SS is arranged in proximity to the object side of the third lens group Gr3. The aperture stop SS moves together with the third lens group Gr3.

Table 4 shows lens data of a second numerical embodiment in which specific numerical values are applied to the zoom lens 2 according to the second embodiment.

TABLE 4

| RADIUS OF CURVATURE | AXIAL SURFACE DISTANCE | REFRACTIVE INDEX | ABBE NUMBER |
|---|---|---|---|
| r1 = 499.870 | d1 = 1.800 | N1 = 1.84666 | ν1 = 23.78 |
| r2 = 72.433 | d2 = 0.010 | N2 = 1.51400 | ν2 = 42.83 |
| r3 = 72.433 | d3 = 7.549 | N3 = 1.83481 | ν3 = 42.72 |
| r4 = 543.957 | d4 = 0.150 | | |
| r5 = 51.875 | d5 = 6.422 | N4 = 1.83481 | ν4 = 42.72 |
| r6 = 120.440 | d6 = variable | | |
| r7 = 101.813 | d7 = 1.300 | N5 = 1.77250 | ν5 = 49.36 |
| r8 = 16.363 | d8 = 9.742 | | |
| r9 = −28.617 | d9 = 1.000 | N6 = 1.75500 | ν6 = 52.32 |
| r10 = 75.219 | d10 = 0.259 | | |
| r11 = 50.587 | d11 = 7.819 | N7 = 1.80518 | ν7 = 25.46 |
| r12 = −40.687 | d12 = 2.355 | | |
| r13 = −20.462 | d13 = 1.000 | N8 = 1.77250 | ν8 = 49.62 |
| r14 = −36.019 | d14 = variable | | |
| r15 = aperture stop | d15 = 1.700 | | |
| r16 = 41.010 | d16 = 1.000 | N9 = 1.88300 | ν9 = 40.80 |
| r17 = 23.512 | d17 = 0.010 | N10 = 1.51400 | ν10 = 42.83 |
| r18 = 23.512 | d18 = 8.316 | N11 = 1.65844 | ν11 = 50.85 |
| r19 = −90.909 | d19 = 0.150 | | |
| r20 = 116.447 | d20 = 3.429 | N12 = 1.83481 | ν12 = 42.72 |
| r21 = −130.962 | d21 = 1.860 | | |
| r22 = −47.713 | d22 = 1.200 | N13 = 1.90366 | ν13 = 31.32 |
| r23 = −328.584 | d23 = variable | | |
| r24 = 36.187 | d24 = 7.840 | N14 = 1.49700 | ν14 = 81.61 |
| r25 = −50.232 | d25 = 0.150 | | |
| r26 = 56.411 | d26 = 3.716 | N15 = 1.49700 | ν15 = 81.61 |
| r27 = −217.711 | d27 = 1.286 | | |
| r28 = −130.474 | d28 = 0.950 | N16 = 1.90366 | ν16 = 31.32 |
| r29 = 59.677 | d29 = 0.010 | N17 = 1.51400 | ν17 = 42.83 |
| r30 = 59.677 | d30 = 8.271 | N18 = 1.48749 | ν18 = 70.44 |
| r31 = −23.811 | d31 = 0.010 | N19 = 1.51400 | ν19 = 42.83 |
| r32 = −23.811 | d32 = 1.450 | N20 = 1.77250 | ν20 = 49.36 |
| r33 = 236.729 | d33 = 4.472 | | |
| r34 = −69.191 | d34 = 3.884 | N21 = 1.83400 | ν21 = 37.34 |
| r35 = −33.324 | | | |

In Table 4, N2, ν2, N10, ν10, N17, ν17, N19, and ν19 denote the refractive indexes and the Abbe numbers of cementing materials in the cemented lenses.

A distance d6 between the first lens group Gr1 and the second lens group Gr2, a distance d14 between the second lens group Gr2 and the aperture stop SS, and a distance d23 between the third lens group Gr3 and the fourth lens group Gr4 vary during zooming from the wide-angle end to the telephoto end. The values of the distances d6, d14, and d23 in the second numerical embodiment measured at the wide-angle end (f=24.70), at the intermediate focal length (f=37.98) between the wide-angle end and the telephoto end, and at the telephoto end (f=68.28) are shown in Table 5 along with focal lengths f, F-numbers FNO, and angles of view 2ω.

TABLE 5

| f   | 24.70  | 37.98  | 68.28  |
|-----|--------|--------|--------|
| FNO | 2.89   | 2.89   | 2.91   |
| 2ω  | 83.9   | 59.2   | 34.5   |
| d6  | 2.869  | 10.842 | 28.691 |
| d14 | 15.651 | 7.280  | 1.000  |
| d23 | 8.317  | 3.117  | 0.500  |

A surface closest to the object side of the second lens group Gr2, i.e., an object-side surface r7 of the negative meniscus lens G4, and an image-side surface r33 of the cemented-triplet negative lens of the fourth lens group Gr4, i.e., an image-side surface of the biconcave negative lens G16, are formed of aspherical surfaces. Aspherical coefficients of the above-mentioned surfaces in the second numerical embodiment are shown in Table 6 along with cone constants $\epsilon$.

TABLE 6

ASPHERICAL COEFFICIENTS r7

$\epsilon = 1.0000$
$A4 = 0.12935357 \times 10^{-4}$
$A6 = -0.24245077 \times 10^{-7}$
$A8 = 0.13473347 \times 10^{-9}$
$A10 = -0.40439169 \times 10^{-12}$
$A12 = 0.64586668 \times 10^{-15}$ r33

Figure 6:
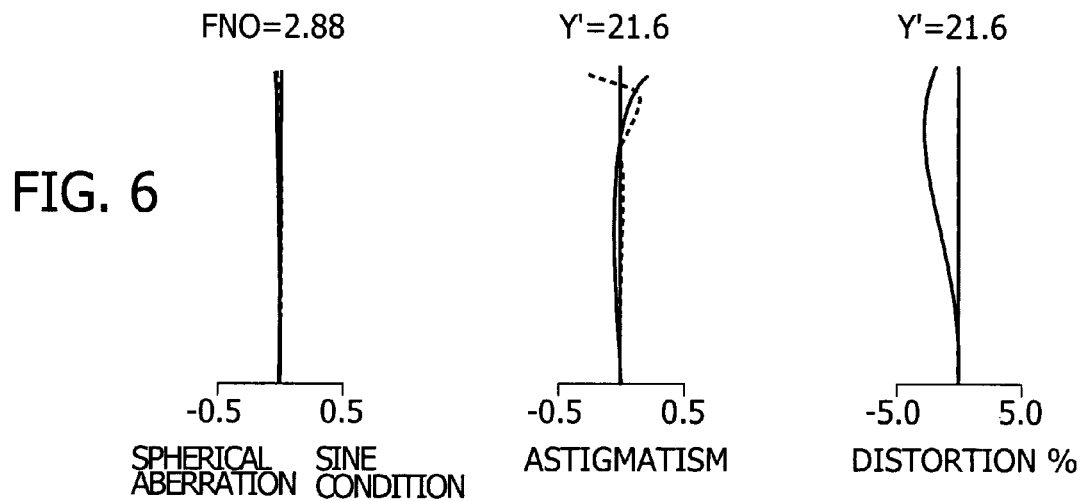
FIG. 6 is a graph showing, along with FIGS. 7 and 8, aberrations of a second numerical embodiment obtained by applying specific numerical values to the zoom lens according to the second embodiment, FIG. 6 showing a spherical aberration, an astigmatism, and a distortion measured at a wide-angle end.
Figure 7:
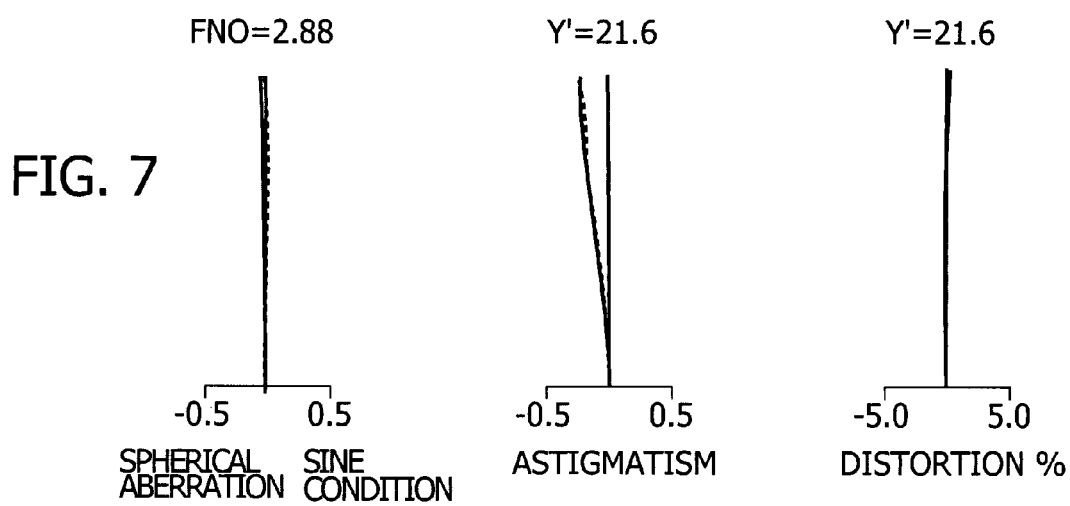
FIG. 7 is a graph showing a spherical aberration, an astigmatism, and a distortion measured at an intermediate focal length.
Figure 8:
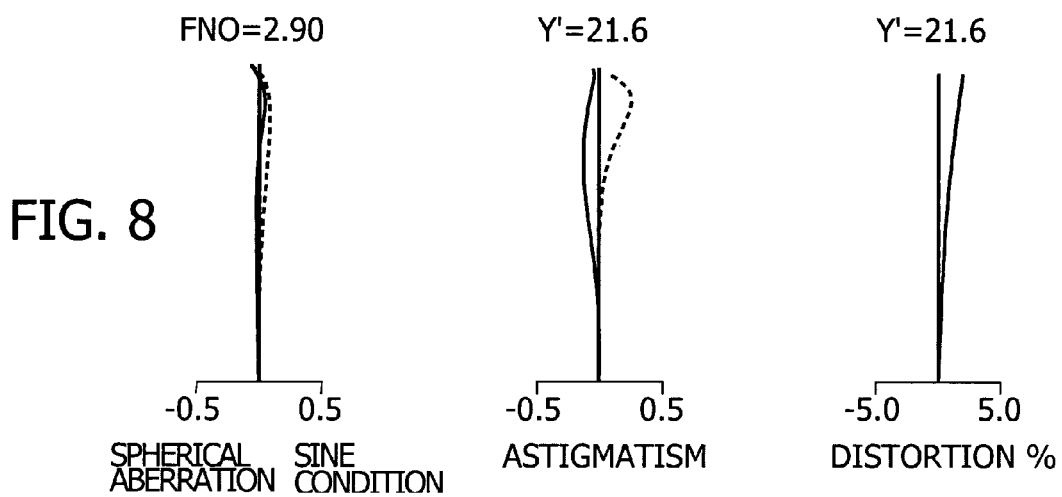
FIG. 8 is a graph showing a spherical aberration, an astigmatism, and a distortion measured at an telephoto end.

$\epsilon = 1.0000$
$A4 = 0.17256069 \times 10^{-4}$
$A6 = -0.25915582 \times 10^{-8}$
$A8 = 0.10983191 \times 10^{-10}$
$A10 = -0.38855952 \times 10^{-13}$ Each of FIGS. 6 to 8 shows a spherical aberration, an astigmatism, and a distortion in the second numerical embodiment which is in focus at infinity. FIG. 6 shows the aberrations measured at the wide-angle end. FIG. 7 shows the aberrations measured at the intermediate focal length. FIG. 8 shows the aberrations measured at the telephoto end. In each of the spherical-aberration graphs, a solid line represents a spherical aberration at a d-line, and a dashed line represents a sine condition. In each of the astigmatism graphs, a solid line represents a sagittal image plane and a dashed line represents a meridional image plane.

Figure 9:
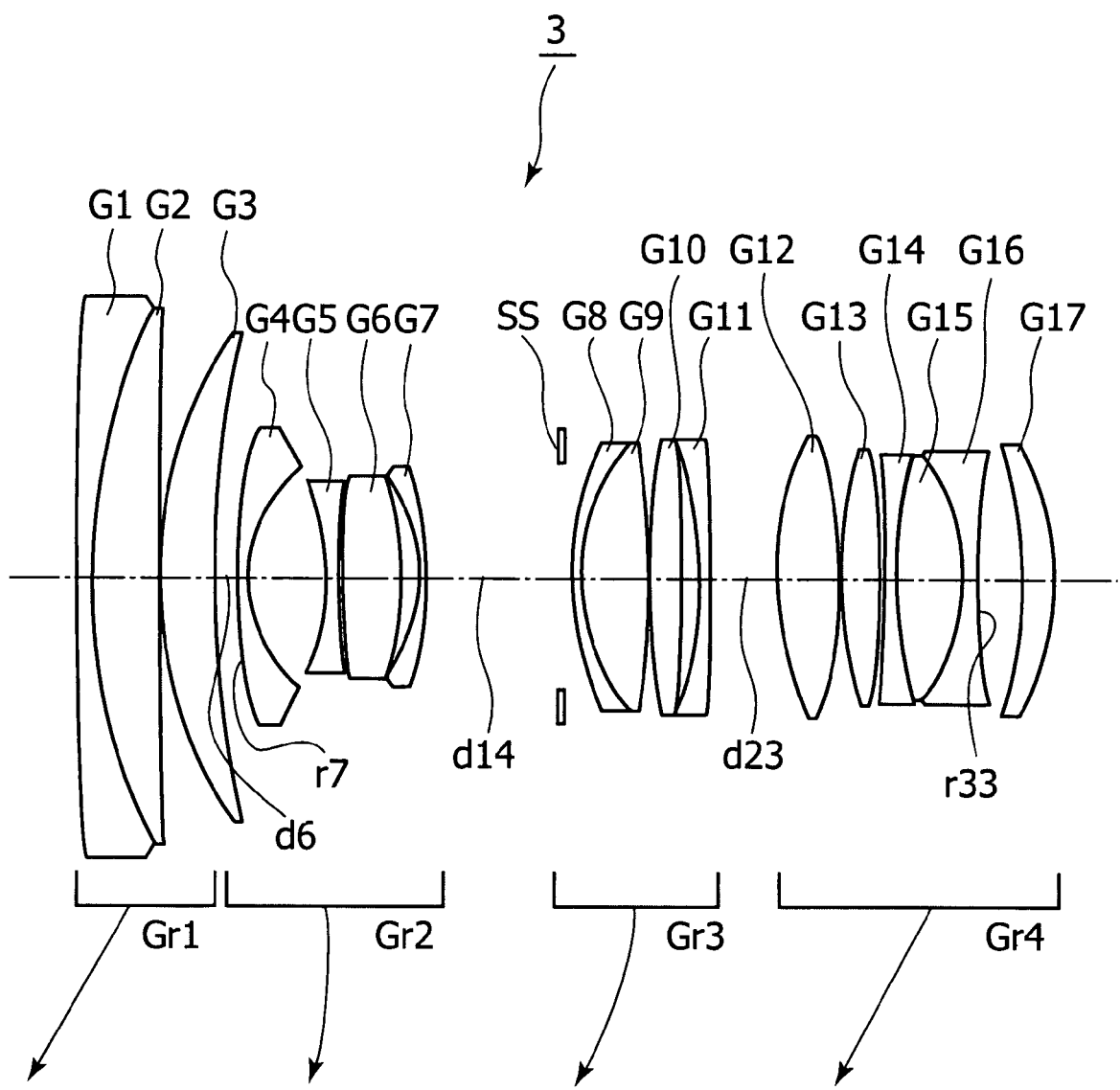
FIG. 9 is a diagram showing the lens construction of a zoom lens according to a third embodiment of the present invention.

FIG. 9 shows the lens construction at a wide-angle end of a zoom lens 3 according to a third embodiment, indicating, with arrows, motion loci of its constituent lens groups along the optical axis toward a telephoto end, respectively.

The zoom lens 3 includes, in the following order from the object side, a first lens group Gr1 having positive refractive power; a second lens group Gr2 having negative refractive power; a third lens group Gr3 having positive refractive power; and a fourth lens group Gr4 having positive refractive power. During zooming from the wide-angle end to the telephoto end, the first to fourth lens groups move toward the object side as indicated by the arrows, respectively, in FIG. 9 such that a distance between the first lens group Gr1 and the second lens group Gr2 increases, a distance between the second lens group Gr2 and the third lens group Gr3 decreases, and a distance between the third lens group Gr3 and the fourth lens group Gr4 decreases. Further, the second lens group Gr2 moves along the optical axis to perform focusing.

The first lens group Gr1 includes, in the following order from the object side, a cemented positive lens made of a negative meniscus lens G1 and a positive meniscus lens G2, each having a convex surface facing the object side; and a positive meniscus lens G3 having a convex surface facing the object side. The second lens group Gr2 includes, in the following order from the object side, a negative meniscus lens G4 having a convex surface facing the object side and having the object-side surface formed of an aspherical surface; a biconcave negative lens G5; a biconvex positive lens G6; and a negative meniscus lens G7 having a convex surface facing the image side. The third lens group Gr3 includes, in the following order from the object side, a cemented positive lens made of a negative meniscus lens G8 having a convex surface facing the object side and a biconvex positive lens G9; a biconvex positive lens G10; and a negative meniscus lens G11 having a convex surface facing the image side. The fourth lens group Gr4 includes, in the following order from the object side, a biconvex positive lens G12; a biconvex positive lens G13; a cemented-triplet negative lens (block); and a positive meniscus lens G17 having a convex surface facing the image side. The cemented-triplet negative lens (block) includes, in the following order from the object side, a biconcave negative lens G14; a biconvex positive lens G15; and a biconcave negative lens. G16 having an image-side surface formed of an aspherical surface. Further, an aperture stop SS is arranged in proximity to the object side of the third lens group Gr3. The aperture stop SS moves together with the third lens group Gr3.

Table 7 shows lens data of a third numerical embodiment in which specific numerical values are applied to the zoom lens 3 according to the third embodiment.

TABLE 7

| RADIUS OF CURVATURE | AXIAL SURFACE DISTANCE | REFRACTIVE INDEX | ABBE NUMBER |
|---|---|---|---|
| r1 = 504.081 | d1 = 1.800 | N1 = 1.84666 | ν1 = 23.78 |
| r2 = 71.854 | d2 = 0.010 | N2 = 1.51400 | ν2 = 42.83 |
| r3 = 71.854 | d3 = 7.700 | N3 = 1.83481 | ν3 = 42.72 |
| r4 = 584.881 | d4 = 0.150 | | |
| r5 = 50.971 | d5 = 6.500 | N4 = 1.83481 | ν4 = 42.72 |
| r6 = 117.843 | d6 = variable | | |
| r7 = 98.067 | d7 = 1.250 | N5 = 1.77250 | ν5 = 49.36 |
| r8 = 16.107 | d8 = 9.330 | | |
| r9 = −30.479 | d9 = 1.000 | N6 = 1.80420 | ν6 = 46.50 |
| r10 = 73.121 | d10 = 0.290 | | |
| r11 = 49.985 | d11 = 6.960 | N7 = 1.84666 | ν7 = 23.78 |
| r12 = −43.586 | d12 = 2.660 | | |
| r13 = −19.820 | d13 = 1.000 | N8 = 1.77250 | ν8 = 49.62 |
| r14 = −34.419 | d14 = variable | | |
| r15 = aperture stop | d15 = 1.700 | | |
| r16 = 44.559 | d16 = 1.000 | N9 = 1.88300 | ν9 = 40.80 |
| r17 = 22.781 | d17 = 0.010 | N10 = 1.51400 | ν10 = 42.83 |
| r18 = 22.781 | d18 = 8.540 | N11 = 1.72000 | ν11 = 50.34 |
| r19 = −90.909 | d19 = 0.150 | | |
| r20 = 141.075 | d20 = 3.060 | N12 = 1.83481 | ν12 = 42.72 |
| r21 = −154.416 | d21 = 2.020 | | |
| r22 = −46.164 | d22 = 1.100 | N13 = 1.90366 | ν13 = 31.32 |
| r23 = −191.269 | d23 = variable | | |
| r24 = 36.148 | d24 = 7.700 | N14 = 1.49700 | ν14 = 81.61 |
| r25 = −52.812 | d25 = 0.250 | | |
| r26 = 66.234 | d26 = 4.200 | N15 = 1.49700 | ν15 = 81.61 |
| r27 = −84.106 | d27 = 0.760 | | |
| r28 = −100.000 | d28 = 0.950 | N16 = 1.90366 | ν16 = 31.32 |
| r29 = 73.539 | d29 = 0.010 | N17 = 1.51400 | ν17 = 42.83 |
| r30 = 73.539 | d30 = 8.100 | N18 = 1.48749 | ν18 = 70.44 |
| r31 = −23.330 | d31 = 0.010 | N19 = 1.51400 | ν19 = 42.83 |
| r32 = −23.330 | d32 = 1.450 | N20 = 1.77250 | ν20 = 49.36 |
| r33 = 296.121 | d33 = 5.000 | | |
| r34 = −61.290 | d34 = 3.880 | N21 = 1.83400 | ν21 = 37.34 |
| r35 = −32.148 | | | |

In Table 7, N2, ν2, N10, ν10, N17, ν17, N19, and ν19 denote the refractive indexes and the Abbe numbers of cementing materials in the cemented lenses.

The distance d6 between the first lens group Gr1 and the second lens group Gr2, the distance d14 between the second lens group Gr2 and the aperture stop SS, and the distance d23 between the third lens group Gr3 and the fourth lens group Gr4 vary during zooming from the wide-angle end to the telephoto end. The values of the distances d6, d14, and d23 in the third embodiment measured at the wide-angle end (f=24.70), at the intermediate focal length (f=37.98) between the wide-angle end and the telephoto end, and at the telephoto end (f=68.28) are shown in Table 8 along with focal lengths f, F-numbers FNO, and angles of view 2ω.

TABLE 8

| f   | 24.70  | 37.98  | 67.95  |
|-----|--------|--------|--------|
| FNO | 2.88   | 2.88   | 2.90   |
| 2ω  | 83.8   | 59.1   | 34.7   |
| d6  | 2.778  | 12.920 | 26.688 |
| d14 | 15.202 | 7.708  | 1.000  |
| d23 | 8.124  | 3.250  | 0.500  |

A surface closest to the object side of the second lens group Gr2, i.e., the object-side surface r7 of the negative meniscus lens G4, and an image-side surface r33 of the cemented-triplet negative lens of the fourth lens group Gr4, i.e., the image-side surface of the biconcave negative lens G16, are formed of aspherical surfaces. Aspherical coefficients of the above-mentioned surfaces in the third numerical embodiment are shown in Table 9 along with cone constants ε.

TABLE 9

ASPHERICAL COEFFICIENTS r7

$\epsilon = 1.0000$
$A4 = 0.12736009 \times 10^{-4}$
$A6 = -0.67365016 \times 10^{-8}$
$A8 = -0.71808301 \times 10^{-10}$
$A10 = 0.78825874 \times 10^{-12}$
$A12 = -0.26948768 \times 10^{-14}$
$A14 = 0.37189316 \times 10^{-17}$ r33

Figure 10:
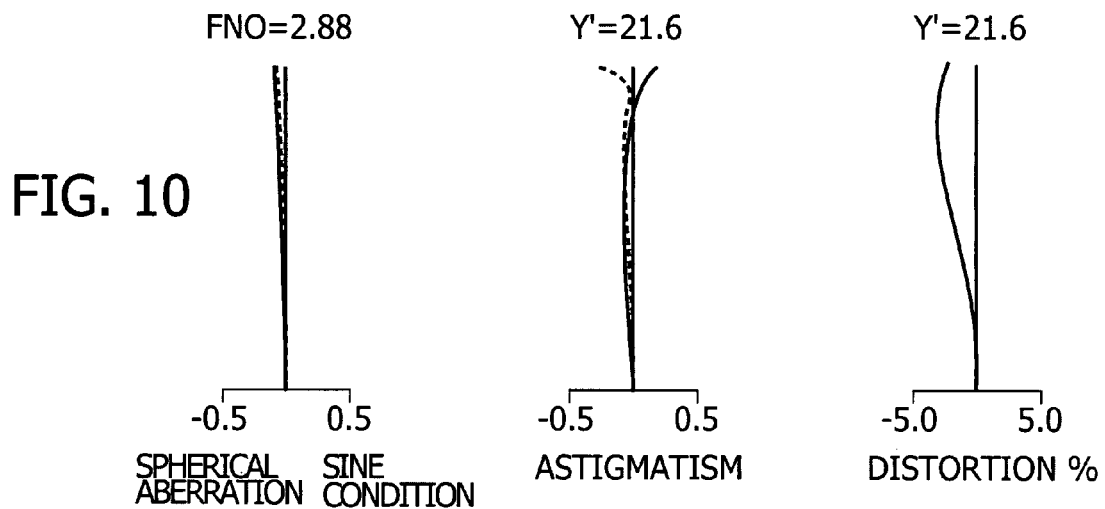
FIG. 10 is a graph showing, along with FIGS. 11 and 12, aberrations of a third numerical embodiment obtained by applying specific numerical values to the zoom lens according to the third embodiment, FIG. 10 showing a spherical aberration, an astigmatism, and a distortion measured at a wide-angle end.
Figure 11:
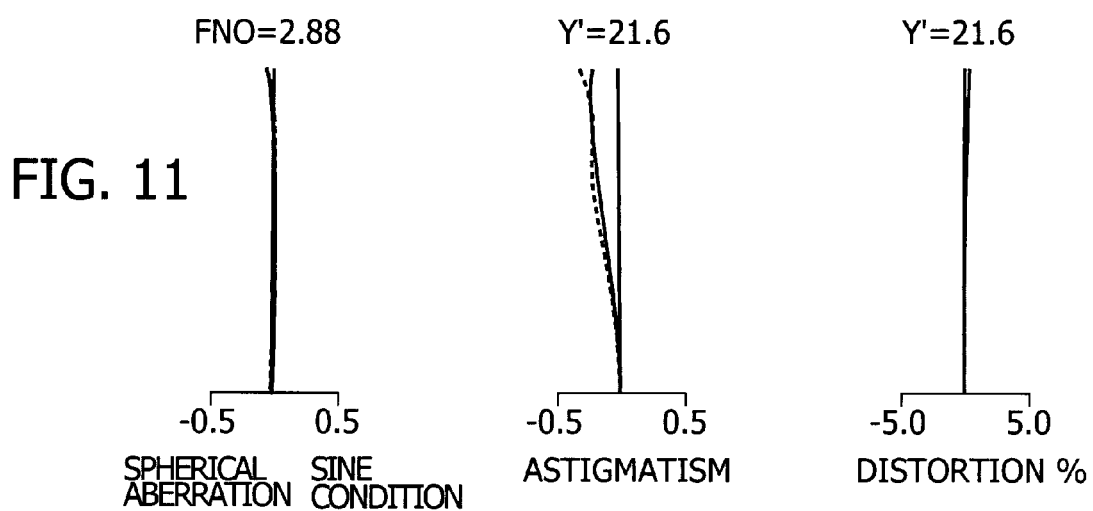
FIG. 11 is a graph showing a spherical aberration, an astigmatism, and a distortion measured at an intermediate focal length.
Figure 12:
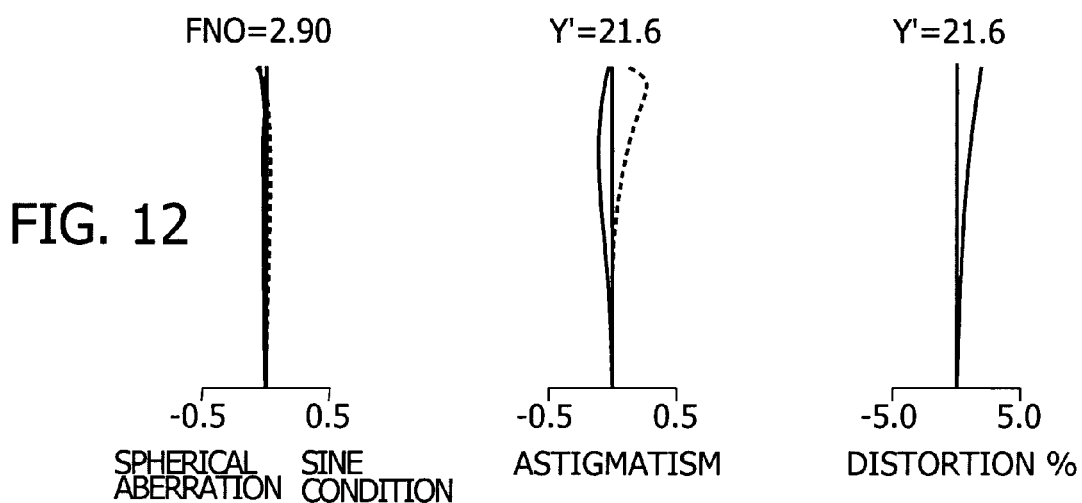
FIG. 12 is a graph showing a spherical aberration, an astigmatism, and a distortion measured at a telephoto end.

$\epsilon = 1.0000$
$A4 = 0.17495023 \times 10^{-4}$
$A6 = 0.38801483 \times 10^{-8}$
$A8 = -0.11234198 \times 10^{-9}$
$A10 = 0.10535738 \times 10^{-11}$
$A12 = -0.46012946 \times 10^{-14}$
$A14 = 0.73037374 \times 10^{-17}$ Each of FIGS. 10 to 12 shows a spherical aberration, an astigmatism, and a distortion in the third embodiment which is in focus at infinity. FIG. 10 shows the aberrations measured at the wide-angle end. FIG. 11 shows the aberrations measured at the intermediate focal length. FIG. 12 shows the aberrations measured at the telephoto end. In each of the spherical-aberration graphs, a solid line represents a spherical aberration at a d-line and a dashed line represents a sine condition. In each of the astigmatism graphs, a solid line represents a sagittal image plane and a dashed line represents a meridional image plane.

The following Table 10 shows numerical values for obtaining conditions of the conditional formulae (1) and (2) of the zoom lenses disclosed in the first to third numerical embodiments, as well as the respective conditional formulae.

TABLE 10

| CONDITIONAL FORMULA | NUMERICAL EMBODIMENT 1 | NUMERICAL EMBODIMENT 2 | NUMERICAL EMBODIMENT 3 |
|---|---|---|---|
| (1) Ld1-Ld2 | 0.41 | 0.42 | 0.42 |
| (2) f2/fw | −0.63 | −0.66 | −0.65 |

As is apparent from Table 10 shown above, the zoom lenses according to the first to third numerical embodiments satisfy the conditional formulae (1) and (2). Further, as shown in the aberration graphs, their aberrations are corrected with good balance at the wide-angle end, the intermediate focal length between the wide-angle end and the telephoto end, and the telephoto end.

An image capture apparatus according to an embodiment of the present invention will be described next.

The image capture apparatus includes a zoom lens, and an imager device for converting an optical image formed by the zoom lens into an electrical signal. The zoom lens includes, in the following order from the object side, a first lens group having positive refractive power; a second lens group having negative refractive power; a third lens group having positive refractive power; and a fourth lens group having positive refractive power. During zooming from the wide-angle end to the telephoto end, a distance between the first and second lens groups increases, a distance between the second and third lens groups decreases, and a distance between the third and fourth lens groups decreases. The zoom lens includes at least one cemented-triplet lens block having negative refractive power, in the fourth lens group.

Figure 13:
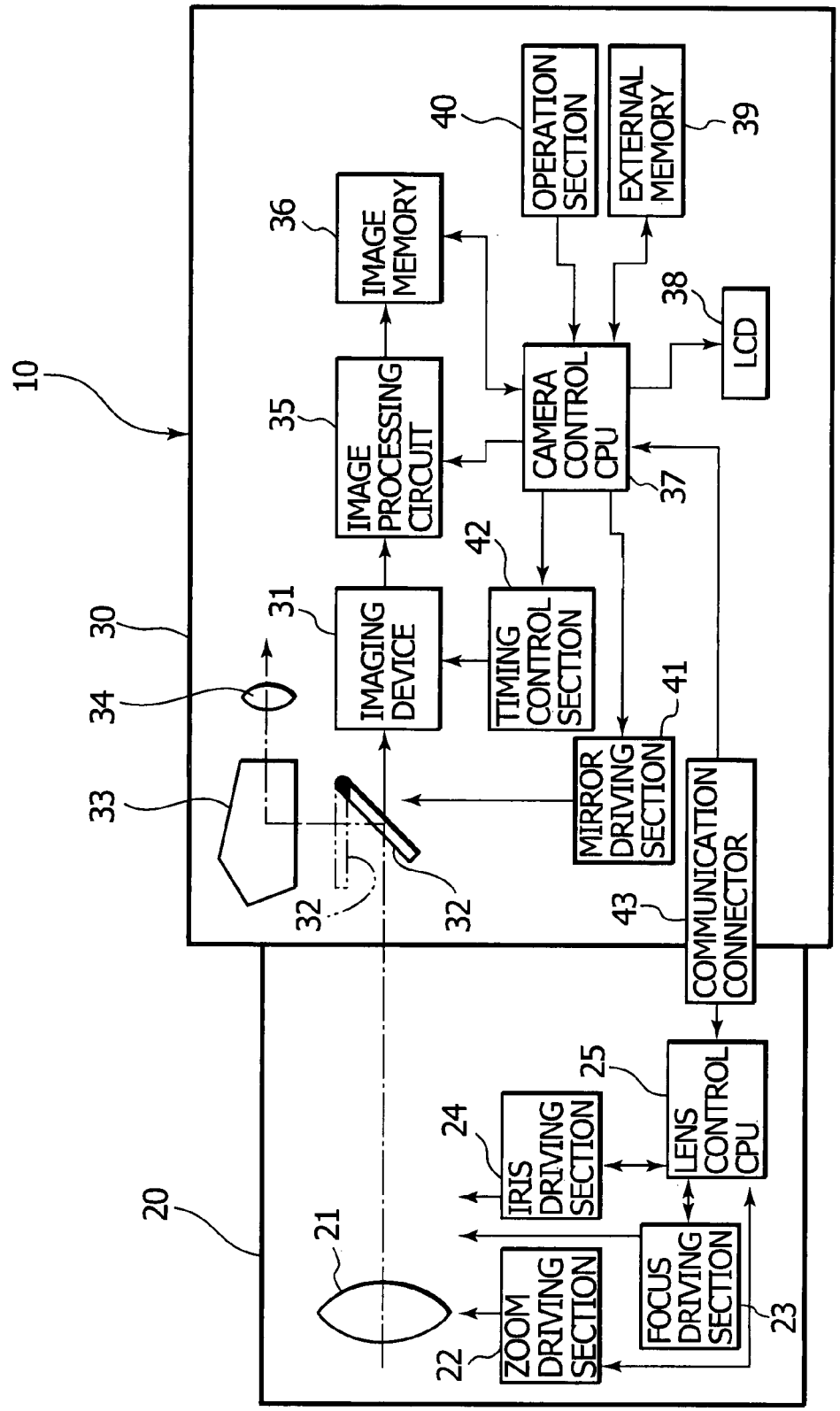
FIG. 13 is a block diagram showing an image capture apparatus according to an embodiment of the present invention.

FIG. 13 is a block diagram of a digital camera according to an embodiment of the image capture apparatus of the present invention.

A digital camera 10 is constructed as an interchangeable lens type, so-called single-lens reflex camera. The digital camera 10 is designed for use such that a lens unit 20 is releasably attached to a camera body 30 having an imager device.

The lens unit 20 includes a zoom lens or a single-focus lens; a driving section for driving various parts of the lens and a control section for driving and controlling the driving section. The lens unit 20 can use any of the above-described zoom lenses as the lens. Namely, the lens unit 20 can use any of the above-described zoom lenses according to the zoom lenses 1 to 3 disclosed in the above-described embodiments and their numerical embodiments, or according to any embodiment other than the above-described embodiments and numerical embodiments. When the above-mentioned lens is a zoom lens 21, the lens unit 20 includes various driving sections, such as a zoom driving section 22 for moving predetermined lens groups during zooming, a focus driving section 23 for moving predetermined lens groups during focusing, and an iris driving section 24 for changing the diameter of the aperture stop. The lens unit 20 further includes a lens control CPU (Central Processing Unit) 25 for driving these driving sections.

The camera body 30 includes an imaging device 31 for converting an optical image formed by the zoom lens 21 into an electrical signal. Also, a jump-up mirror 32 is arranged in front of the imaging device 31 to guide light from the zoom lens 21 to a pentaprism 33, and further from the pentaprism 33 to an eyepiece, or ocular lens, 34. Thus, a photographer can view the optical image formed by the zoom lens 21 through the eyepiece 34.

As the imaging device 31, a CCD (Charge Coupled Device) or a CMOS (Complementary Metal-Oxide Semiconductor) may be applicable, for example. The electrical image signal outputted from the imager device 31 is subjected to various processing at an image processing circuit 35, then data-compressed with a predetermined method, and temporarily saved in an image memory 36 as image data.

A camera control CPU (Central Processing Unit) 37 centrally controls both the camera body 30 and the lens unit 20 as a whole. The CPU 37 extracts the image data temporarily saved in the image memory 36 for display on a liquid crystal display device 38 or for storage in an external memory 39. Also, the camera control CPU 37 reads out image data saved in the external memory 39 to display it on the liquid crystal display device 38. Signals from an operation section 40 including a shutter release switch and a zooming switch are supplied to the camera control CPU 37, and the CPU 37 controls various parts responsive to these signals from the operation section 40. For example, when the shutter release switch is operated, the camera control CPU 37 gives one command to a mirror driving section 41 and another command to a timing control section 42. Then, the mirror driving section 41 jumps up the jump-up mirror 32 as shown by dot-dot-dashed lines in the figure, to allow entrance of light rays from the zoom lens 21 to the imaging device 31, and the timing control section 42 controls signal read timing at the imaging device. The camera body 30 and the lens unit 20 are interconnected with a communication connector 43. Signals related to control of the zoom lens 21, e.g., an AF (Auto Focus) signal, an AE (Auto Exposure) signal, and a zooming signal, are delivered to the lens control CPU 25 via the communication connector 43 from the camera control CPU 37, and then the lens control CPU 25 controls the zoom driving section 21, the focus driving section 23, and the iris driving section 24 to set the zoom lens 21 to a predetermined state.

While the image capture apparatus has been disclosed as a single-lens reflex camera in the above embodiment, the apparatus may be applied as a fixed-lens camera. Alternatively, the image capture apparatus may be applied not only as a digital camera, but as a silver-salt-film camera as well.

In addition, the shapes of the respective sections as well as the numerical values that have been referred to in the above description of the embodiments are provided merely as one example for illustrative purposes for ease of understanding of various embodiments for carrying out the present invention, and these embodiments are not to be construed as limiting the technical scope of the present invention.

In the above-mentioned embodiments of the present invention, it is possible to achieve high performance and compactness, and also ensure back focus sufficiently.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-270765 filed in the Japanese Patent Office on Oct. 2, 2006, the entire contents of which being incorporated herein by reference.

What is claimed is:

1. A zoom lens, comprising, in an order from an object side:
a first lens group having positive refractive power;
a second lens group having negative refractive power;
a third lens group having positive refractive power; and
a fourth lens group having positive refractive power, and wherein:
during power variation from a wide-angle end to a telephoto end, a distance between the first lens group and the second lens group increases, a distance between the second lens group and the third lens group decreases, and a distance between the third lens group and the fourth lens group decreases, and
the zoom lens includes in the fourth lens group at least one cemented-triplet lens block having negative refractive power,
wherein the following conditional formula (2) is satisfied:

$$0.8 < f2/fw < -0.2, \qquad (2)$$

where:
f2 represents a composite focal length of the second lens group, and
fw represents a composite focal length of a total system at the wide-angle end.

2. The zoom lens according to claim 1, wherein the cemented-triplet lens block includes, in an order from the object side, a lens having negative refractive power; a lens having positive refractive power; and a lens having negative refractive power.

3. The zoom lens according to claim 1, wherein the cemented-triplet lens block has at least one aspherical surface.

4. The zoom lens according to claim 3, wherein the aspherical surface is formed on a surface closest to an image-plane side of the cemented-triplet lens block.

5. The zoom lens according to claim 1, wherein the following conditional formula (1) is satisfied:

$$0.3 < Ld1 - Ld2 < 0.6, \qquad (1)$$

where:
Ld1 represents a refractive index of a lens positioned closest to the object side of the cemented-triplet lens block, and
Ld2 represents a refractive index of a second lens counted from the object side of the cemented-triplet lens block.

6. An image capture apparatus having a zoom lens and an imager device for converting an optical image formed by the zoom lens into an electrical signal, wherein:
the zoom lens includes, in following order from an object side:
a first lens group having positive refractive power;
a second lens group having negative refractive power;
a third lens group having positive refractive power; and
a fourth lens group having positive refractive power, and
during power variation from a wide-angle end to a telephoto end, a distance between the first lens group and the second lens group increases, a distance between the second lens group and the third lens group decreases, and a distance between the third lens group and the fourth lens group decreases, and the zoom lens includes in the fourth lens group at least one cemented-triplet lens block having negative refractive power, wherein the following conditional formula (2) is satisfied:

$$-0.8 < f2/fw < -0.2, \quad (2)$$

where:

f2 represents a composite focal length of the second lens group, and fw represents a composite focal length of a total system at the wide-angle end.

7. The image capture apparatus according to claim 6, wherein the cemented-triplet lens block includes, in an order from the object side, a lens having negative refractive power; a lens having positive refractive power; and a lens having negative refractive power.

8. The image capture apparatus according to claim 6, wherein the cemented-triplet lens block has at least one aspherical surface.

9. The image capture apparatus according to claim 8, wherein the aspherical surface is formed on a surface closest to an image-plane side of the cemented-triplet lens block.

10. The image capture apparatus according to claim 6, wherein the following conditional formula (1) is satisfied:

$$0.3 < Ld1 - Ld2 < 0.6, \quad (1)$$

where:

Ld1 represents a refractive index of a lens positioned closest to the object side of the cemented-triplet lens block, and Ld2 represents a refractive index of a second lens counted from the object side of the cemented-triplet lens block.

* * * * *